(12) United States Patent
Collins et al.

(10) Patent No.: US 8,086,963 B2
(45) Date of Patent: Dec. 27, 2011

(54) INHERITANCE MODEL BETWEEN MASTERS, LAYOUTS AND SLIDES

(75) Inventors: Nathalie S. Collins, Sunnyvale, CA (US); Hoa N. Lu, Oakland, CA (US); Andy Chin, Sunnyvale, CA (US); Rebecca S. Levine, San Francisco, CA (US); Shawn A. Villaron, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 11/133,653

(22) Filed: May 19, 2005

(65) Prior Publication Data
US 2006/0265659 A1    Nov. 23, 2006

(51) Int. Cl.
*G06F 3/048* (2006.01)
(52) U.S. Cl. .................................... 715/732; 715/731
(58) Field of Classification Search .................. 715/514, 715/731, 730, 513
See application file for complete search history.

(56) References Cited

U.S. PATENT DOCUMENTS

| | | | | |
|---|---|---|---|---|
| 6,038,567 A * | 3/2000 | Young | .................. | 707/103 R |
| 6,181,342 B1 | 1/2001 | Niblack | .................. | 345/635 |
| 7,039,863 B1 * | 5/2006 | Caro et al. | .................. | 715/530 |
| 7,246,316 B2 * | 7/2007 | Furlong et al. | .................. | 715/730 |
| 7,272,789 B2 * | 9/2007 | O'Brien | .................. | 715/517 |
| 2003/0142145 A1 | 7/2003 | Bennett, Jr. et al. | .......... | 345/853 |
| 2004/0001106 A1 | 1/2004 | Deutscher et al. | ............ | 345/838 |
| 2005/0138570 A1 * | 6/2005 | Good et al. | .................. | 715/789 |
| 2007/0186157 A1 * | 8/2007 | Walker et al. | ................. | 715/530 |

* cited by examiner

*Primary Examiner* — Namitha Pillai
(74) *Attorney, Agent, or Firm* — Merchant & Gould

(57) ABSTRACT

An N-level inheritance model is provided to develop presentations. A hierarchical inheritance model includes master slides, custom layout slides, and slides including the material for the presentation. The inheritance model allows presentation authors to both define an overall look for the presentation as well as the ability to customize slide layouts individually. An author may create custom layouts that may be applied to a single slide as well as a set of slides. Properties that are defined at any level within the hierarchy may be inherited by the lower levels within the hierarchy. Each level within the presentation may also make an exception to an inherited property.

20 Claims, 9 Drawing Sheets

INHERITANCE MODEL BETWEEN MASTERS, LAYOUTS AND SLIDES

BACKGROUND OF THE INVENTION

Many individuals and businesses prepare and deliver presentations using a presentation program. Typically, presentation programs allow the user to edit, create, and present slides using their computer. Some characteristics associated with a set of slides may be customized by the user to convey the look and feel desired by the user. Some of the characteristics that may be modified include items such as background, color scheme, text styles, as well as the general slide layout. Once the template associating the characteristics with the slides is created, however, each slide has the same look and feel as the other slides within the presentation.

SUMMARY OF THE INVENTION

Embodiments of the present invention are related to providing an inheritance and exception model for a presentation program that is directed at allowing presentation authors to both define an overall look for the presentation as well as the ability to customize slide layouts and slides individually.

According to one aspect of the invention, a N-level hierarchy model is defined within a presentation program comprising at least a master slide level, a layout level, and a slides level. The multi-level inheritance and exception model is directed toward allowing properties that are defined at any level to be inherited by all of the lower levels, and allowing each level within the presentation to make an exception to an inherited property.

According to another aspect of the invention, an author may create custom layouts which may be applied to a slide or a set of slides. The author may create the custom layout or copy the design from another presentation into the current presentation.

DETAILED DESCRIPTION OF THE PREFERRED EMBODIMENT

Generally, embodiments of the present invention are related to providing an inheritance and exception model for a presentation program. The inheritance and exception model is related toward allowing presentation authors to both define an overall look for the presentation as well as the ability to customize slide layouts individually. The N-level hierarchical inheritance model comprises at least three levels, including master slides, layout slides, and slides including the material for the presentation. An author may also create custom layouts that may be applied to a single slide as well as a set of slides. Properties that are defined at any level within the hierarchy may be inherited by the lower levels within the hierarchy. Each level within the presentation may also make an exception to an inherited property such that the property having an exception associated with it is not inherited from a parent level.

Illustrative Hierarchical Presentation System and Method

Figure 2:
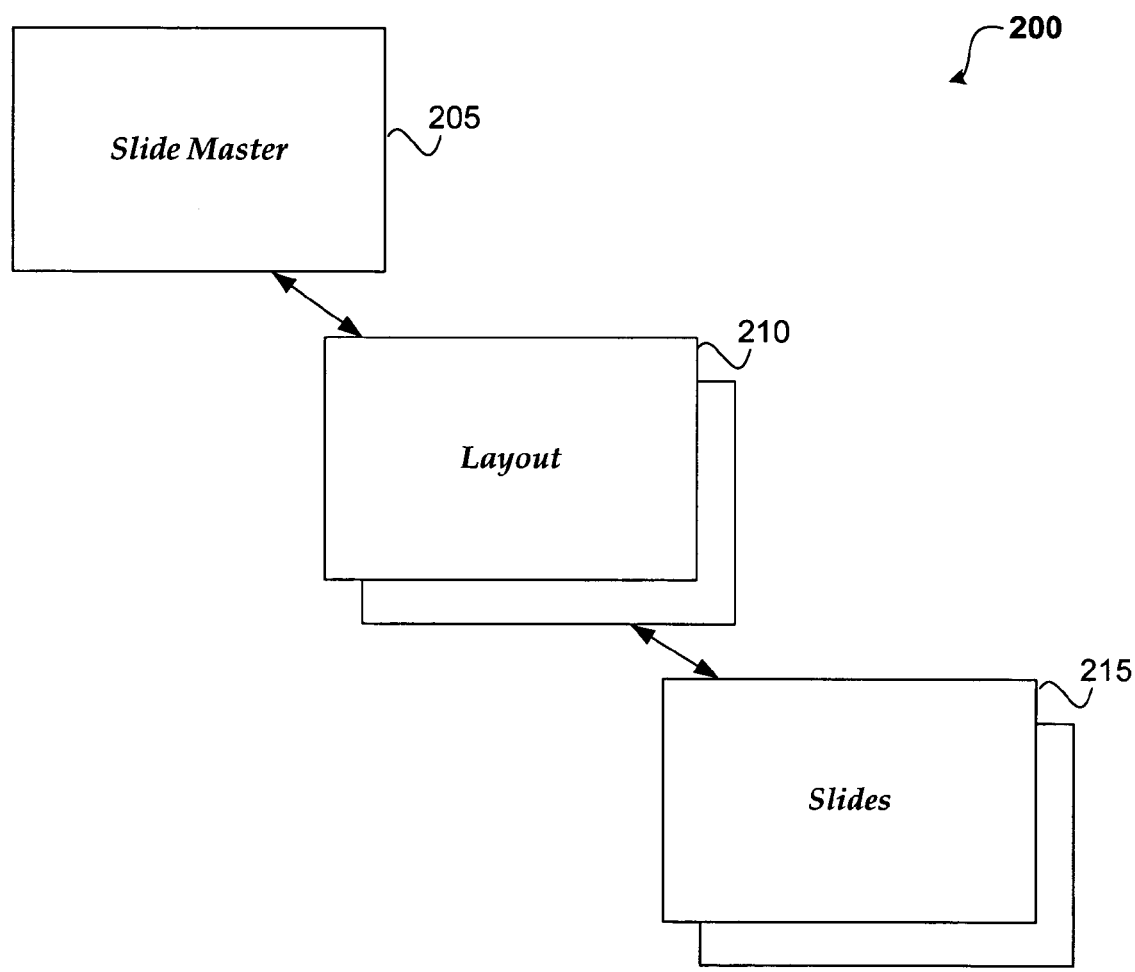
FIG. 2 shows a general overview of an inheritance model between slides within a presentation.

FIG. 2 shows a general overview of an inheritance model between slides within a presentation, in accordance with aspects of the present invention. Referring to FIG. 2, three hierarchical layers are illustrated within the system including slide master 205, layout(s) 210 and slide(s) 215.

According to one embodiment of the invention, each presentation includes at least one slide master (205) and each slide master may include zero or more custom layouts (210) that may be associated with one or more slides (215). Slide master 205 is at the highest level within the hierarchy. Layouts 210 are the second level within the hierarchy and the slides (215) are at the third level within the hierarchy. Slides 215, therefore, inherit their corresponding properties from any associated layouts and the layout s inherit properties from an associated slide master. Changes made to the slide master propagate to the layout level and then propagate to the slide level. Changes made to the layout propagate down to the associated slides. An exception can be made to a property at one or more of the hierarchical levels that overrides the inheritance of that property from parent layers.

Slide master 205 helps to enable presentation authors to create an overall look and feel for a presentation. The slide master determines the styles and background for the presentation. The slide master defines the background, layout color scheme and text styles associated with the presentation.

Slide masters also store the global placeholder and text style definition that is the default for a layouts' position and size of: title placeholders; header, footer and slide placeholders; and logo placeholders.

Each slide master may include a set of layouts (210) that define properties, such as the geometries that go with that slide master. According to one embodiment, a default list of standard layouts are provided with a slide master. These standard layouts may represent many different layouts. Presentation authors can also add additional custom layouts that can be used with its slide master that are based on their own design criteria.

Custom layouts 210 can override slide master 205 by providing exceptions. When changes are made to the slide master, all of the layouts that are a child of the slide master inherit the changes unless the layout provides an exception to that type of change. Each layout may include its own arrangement of body placeholders that share the global style definition from the slide master by default, but may store unique size and position information for each layout.

Each slide within a presentation points to a layout. As discussed above, the layout may be a layout that has been provided or developed by the presentation author or some other user. As with the layout level, each slide (215) can override its associated layout through the use of exceptions.

Figure 3:
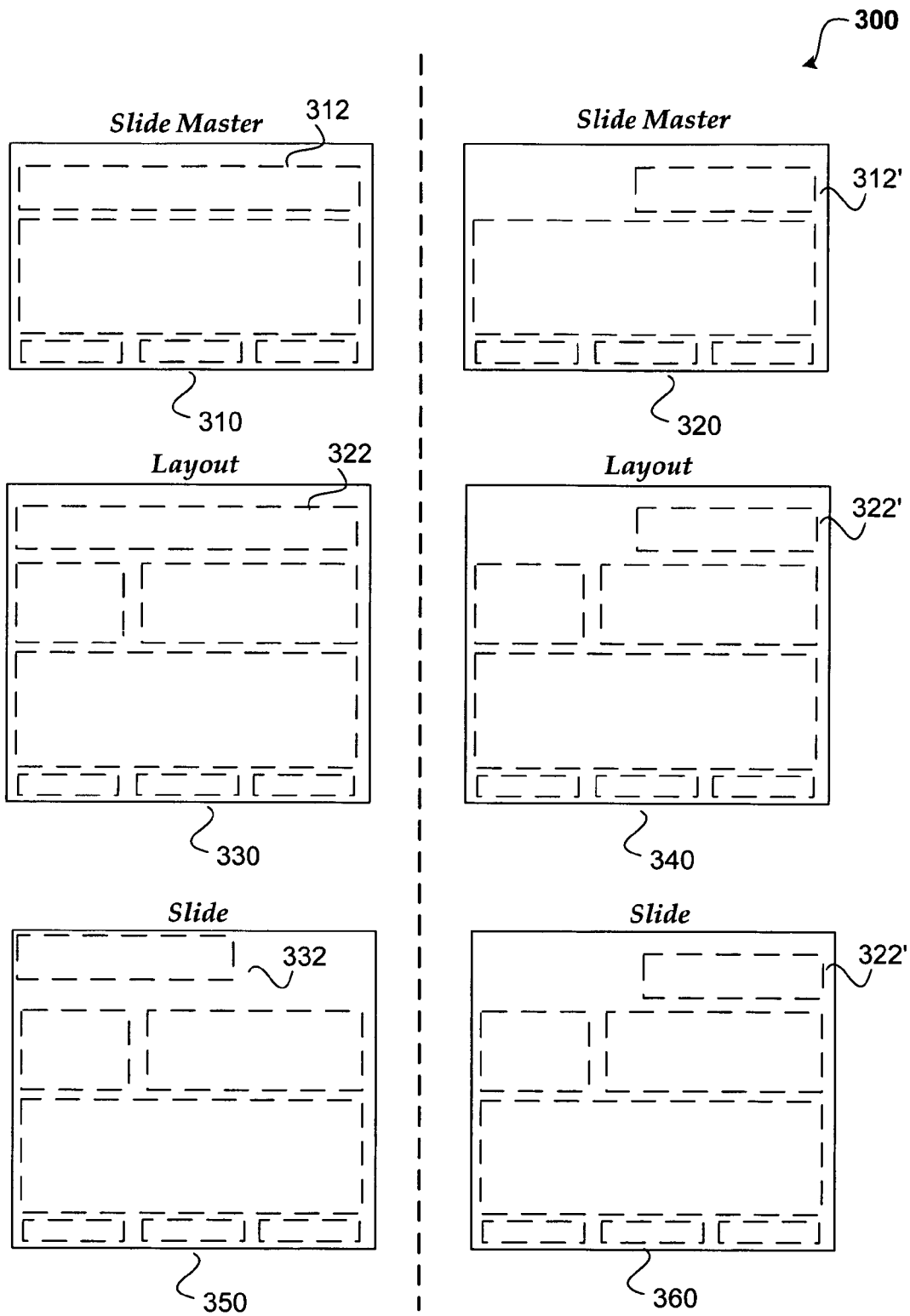
FIG. 3 illustrates inheritance relationships using exemplary slide layouts.

FIG. 3 illustrates inheritance relationships using exemplary slide layouts, in accordance with aspects of the present invention.

Generally, placeholders at the layout level (322, 322' and 332) inherit their text and shape formatting properties from their counterparts on the master slide level. The title placeholder on the layout inherits from the title on the master, the footer on the layout from the footer on the master, and so on. Each of the body placeholders on the layout inherit their formatting from the body placeholder on the master. Therefore, if a red line style is added to the master's body placeholder, all of the body placeholders on all of the layouts would update to have this line style unless an exception is made to the layout.

A layout's background fill and slide transition are inherited, by default, from the master. A user may override these properties on a layout-by-layout basis if desired. Background objects on the master may be hidden or shown for each layout. According to one embodiment, the background objects are shown by default.

Slides point to layouts for their placeholder and slide-level properties. Any change to a property on the layout, if not overridden by the slide, is reflected in all slides that use that layout.

As illustrated, each of the slides (master 310. master 320, layout 330, layout 340, slide 350, and slide 360) include placeholders. The placeholders may be used to store many different items, including but not limited to: a title, a body, a date, a footer, and a slide number. This example refers to a title placeholder associated with each of the slides (312, 312', 322, 322', and 332).

According to one embodiment, there is a one to one correspondence between placeholders on the layout and placeholders on slides pointing to that layout. By default, each placeholder on the slide inherits its position from its "parent" placeholder on the layout referenced by that slide. Therefore, if a placeholder has not been moved or resized on the slide, it will respond to changes in the position/size of its parent placeholder on the layout. When a placeholder on the slide has been moved or resized, however, it no longer inherits its size or position from the placeholder on the layout.

Many properties may be associated with each of the placeholder objects. According to one embodiment, properties relate to the position and size of the object, the shape style of the object, the text style of the object, as well as any animation that is to be applied to the object.

Generally, layouts (both standard and custom) derive the default position of their title, date/time, footer, and slide number placeholders from their counterparts on the master. For each of these placeholders, if no size or position changes have been made on the layout, then their position/size is inherited from the master.

For example, if the title placeholder on a layout has not been moved from its default position, it follows the position of the title placeholder on the master.

Master 310 illustrates default slide master placeholders according to one embodiment of the invention. Master 320 illustrates the resizing of placeholder 312 on master 310 to a newly sized placeholder 312'. In this particular example, placeholder 312' is resized to be narrower as compared to placeholder 312.

Referring to layout 330, the size and positions of title placeholder 322 have not changed from the default value provided by title placeholder 312 in master 310. Moving to layout 340, the title placeholder's size was modified in slide master 320, therefore title placeholder 322' on layout 340 inherits the modified properties from master 320. Similarly, slide 360 inherits the properties from its parents.

Alternatively, if the title placeholder on the slide has been moved or resized, such as in slide 350, the slide no longer responds to changes to the title placeholder's size/position on the master and/or layout. For example, suppose that slide 350 adjusted the title placeholder 332 to be smaller in size and repositioned toward the upper left corner. In this particular example, the slide has created an exception to the title placeholder provided by its parents (layout 320 and slide master 310). Therefore, the title placeholder (332) on the slide (350 and 360) does not inherit the title placeholder.

An exception occurs when a property that may be inherited by a child of a hierarchical object is overridden by the child. For example, slide 350 created both a size exception as well as a position exception when placeholder 322 was moved and resized thereby creating placeholder 332. A size and position exception exists when the size and position property inheritance between a placeholder on the layout and its counterpart on the master is broken. According to one embodiment, this occurs as soon as the presentation author moves or resizes the placeholder on the object.

Figure 4:
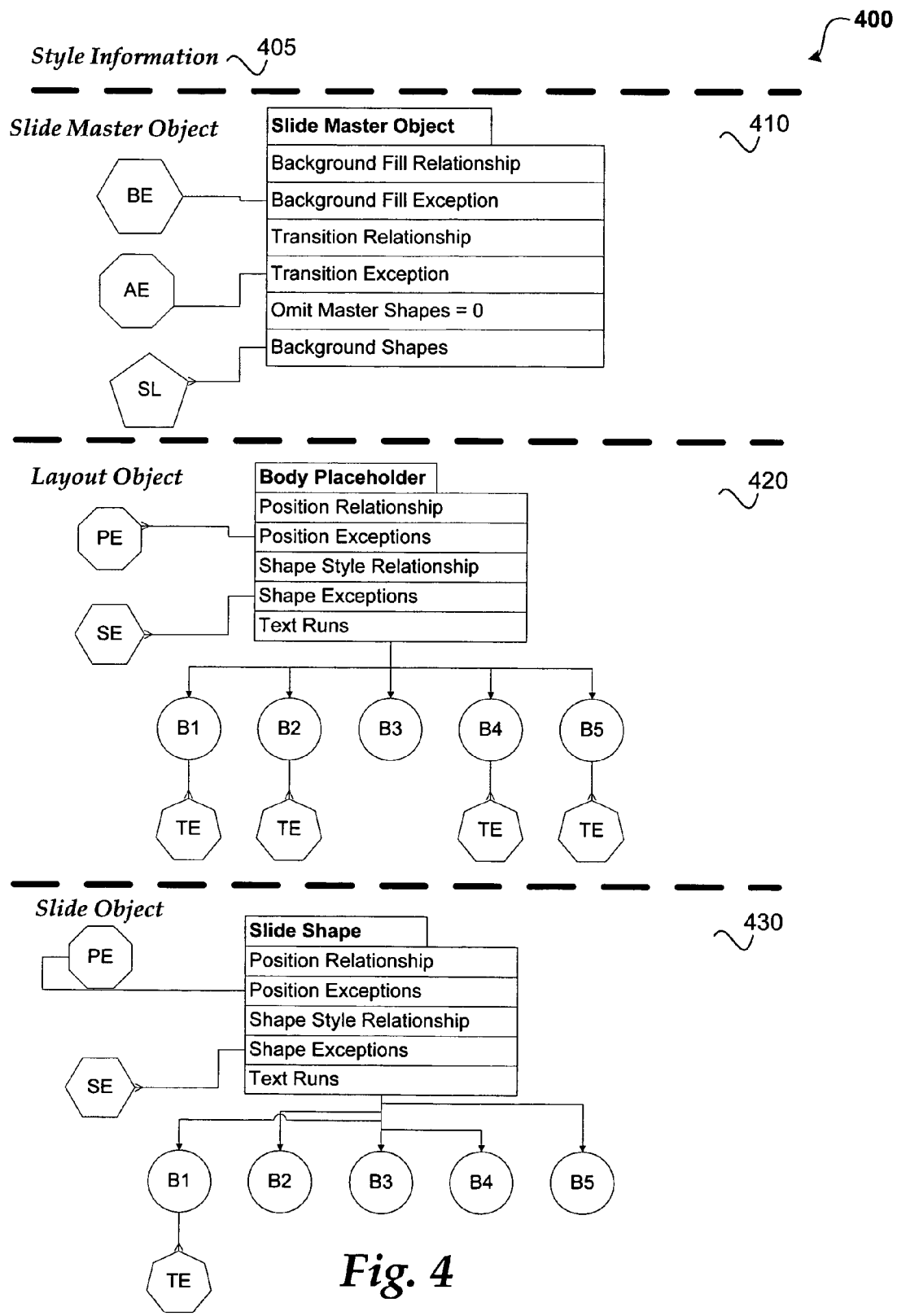
FIG. 4 illustrates objects at three levels within a presentation hierarchy.

FIG. 4 illustrates objects at three levels within a presentation hierarchy, in accordance with aspects of the present invention. Although only three hierarchical levels are shown, N hierarchical levels may be implemented within the presentation hierarchy.

The default relationship between body placeholders on the slide master (410), layout (420) and instantiated slide (430) is illustrated. Placeholders at each level derive their text and shape style from the level above unless an exception is made at the child level. According to one embodiment, the instantiated slide (430) inherits its position from layout 420 and does not inherit position from the slide master object (410). According to one embodiment, general style information for the presentation is stored at style information layer 405. According to another embodiment, the style information may be stored with the slide master.

As discussed above, the slide master object is generally used to set proper set on the master include background fill, any default shapes for slides, and the like. Referring to the slide master object (410) illustrated, BE refers to a background fill exception, AE refers to an animation/transition exception, SL refers to a shape list exception.

Referring to body placeholder object 420, PE refers to a position exception, SE refers to a style exception, B1-B5 refer to body text runs, TE refers to text exceptions. As illustrated, each body text run may or may not have an exception that overrides the slide master object.

According to one embodiment, slide object 430 includes the same exceptions and relationships as body placeholder 420.

Figure 5:
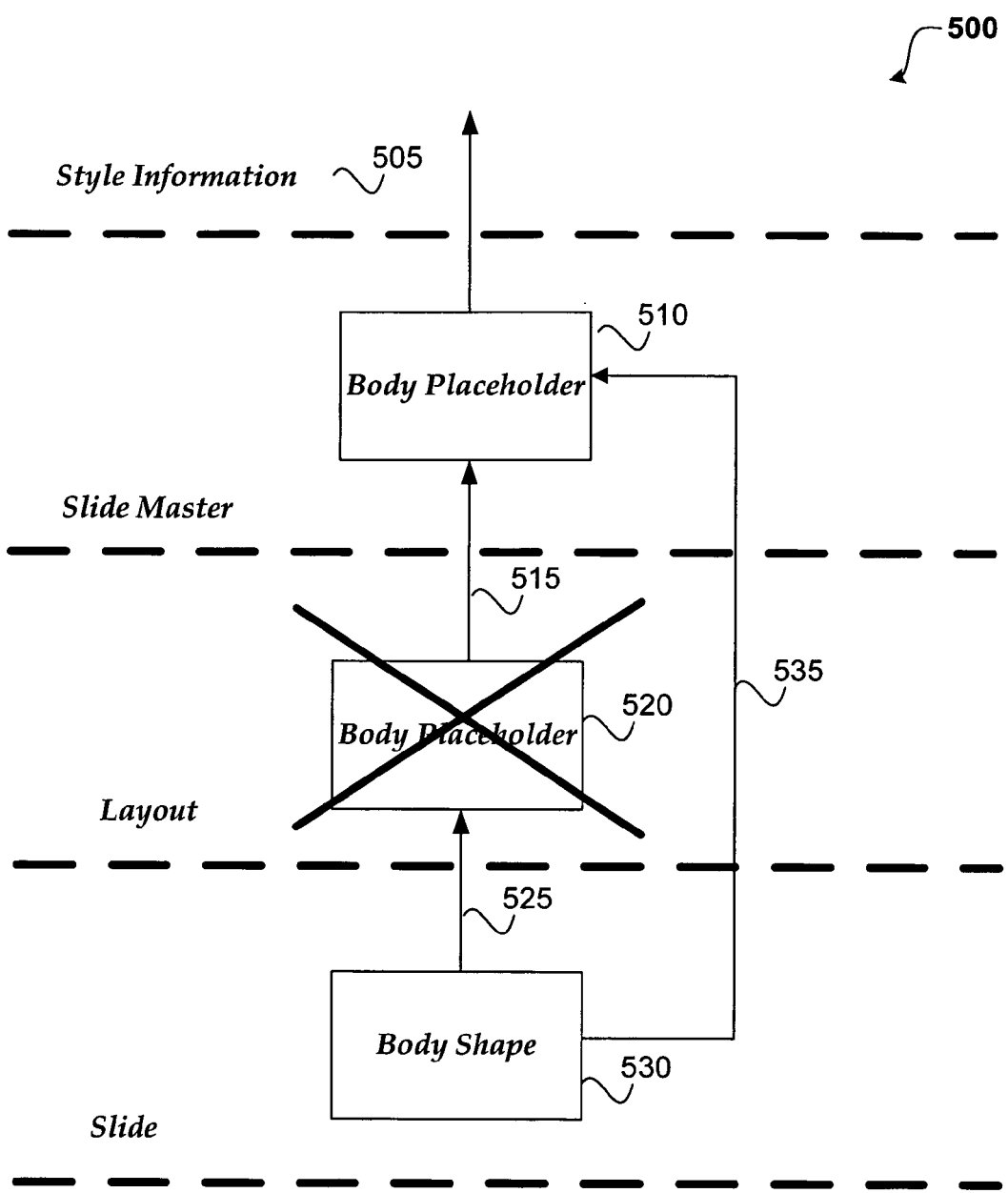
FIG. 5 shows deleting a layout object between the instantiated slide level and the slide master level.

FIG. 5 shows deleting a layout object between the instantiated slide level and the slide master level, in accordance with aspects of the invention.

Deleting parent body placeholder 520 on the layout level causes the slide's body placeholder to inherit its shape and text style properties from the slide master level (see connection 535). According to one embodiment of the invention, the size and position of the slide 530's body placeholder is not inherited from the master.

According to one embodiment, if a new body placeholder is added at the layout level any existing slides are not automatically relinked to the body placeholder at the layout level. Newly added slides, however, inherit the properties from the newly added placeholder. Should a presentation author desire to establish a link with the layout level they can explicitly request the link to be reestablished.

Figure 6:
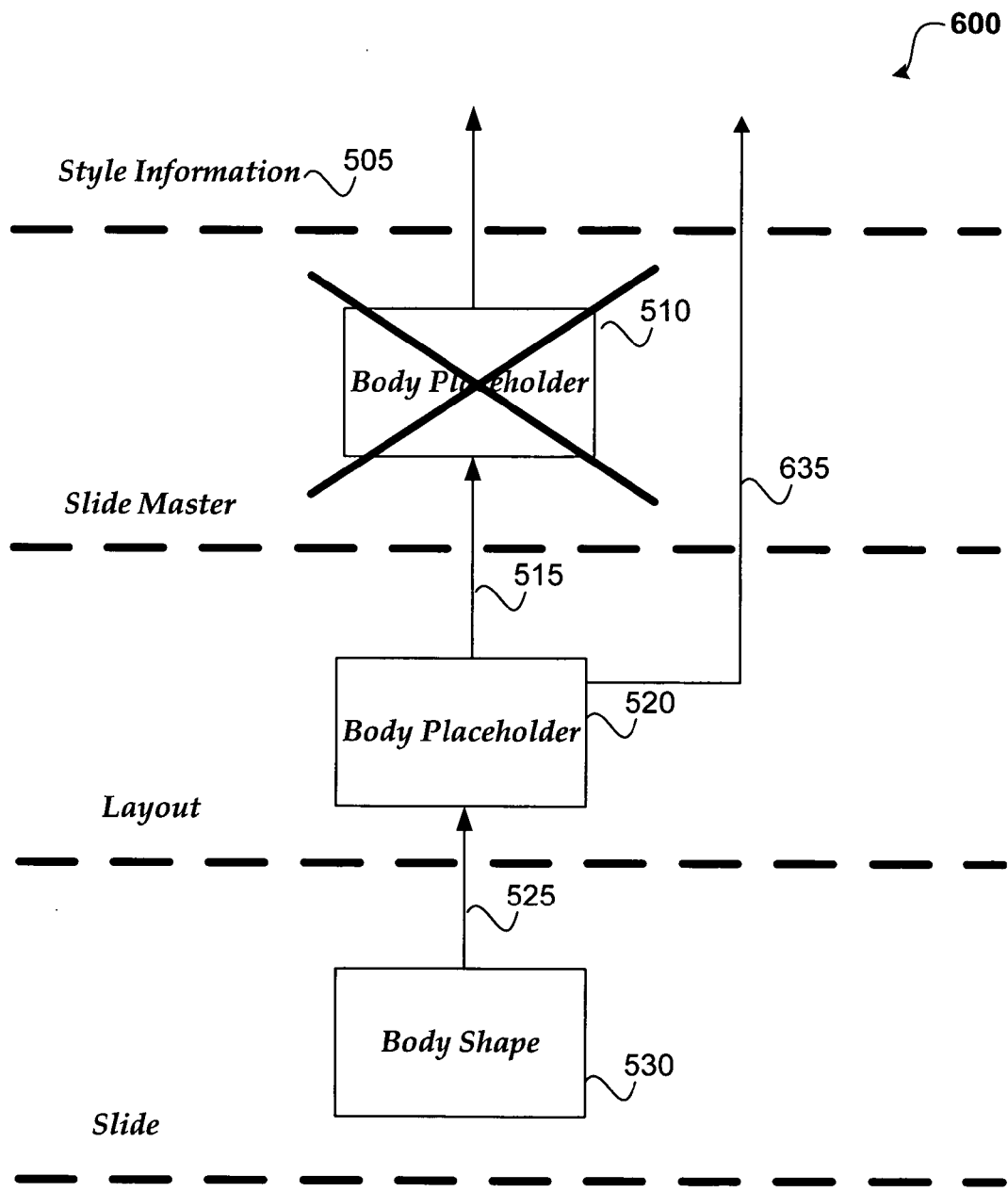
FIG. 6 shows deleting the body placeholder at the slide master level.

FIG. 6 shows deleting the body placeholder at the slide master level, in accordance with aspects of the invention. Deleting the body placeholder (510) on the slide master level causes the layout's body placeholder (520) to inherit its shape and text style properties directly from style information layer (505) (See connection 635). The size and position of the body placeholder on the layout remains unchanged. The body placeholder on the slide continues to inherit its properties from the layout.

According to one embodiment, if a body placeholder is added to the slide master level it is linked such that it inherits its style properties from style information 505 and the body placeholders at the layout level inherit from the newly added body placeholder.

Figure 7:
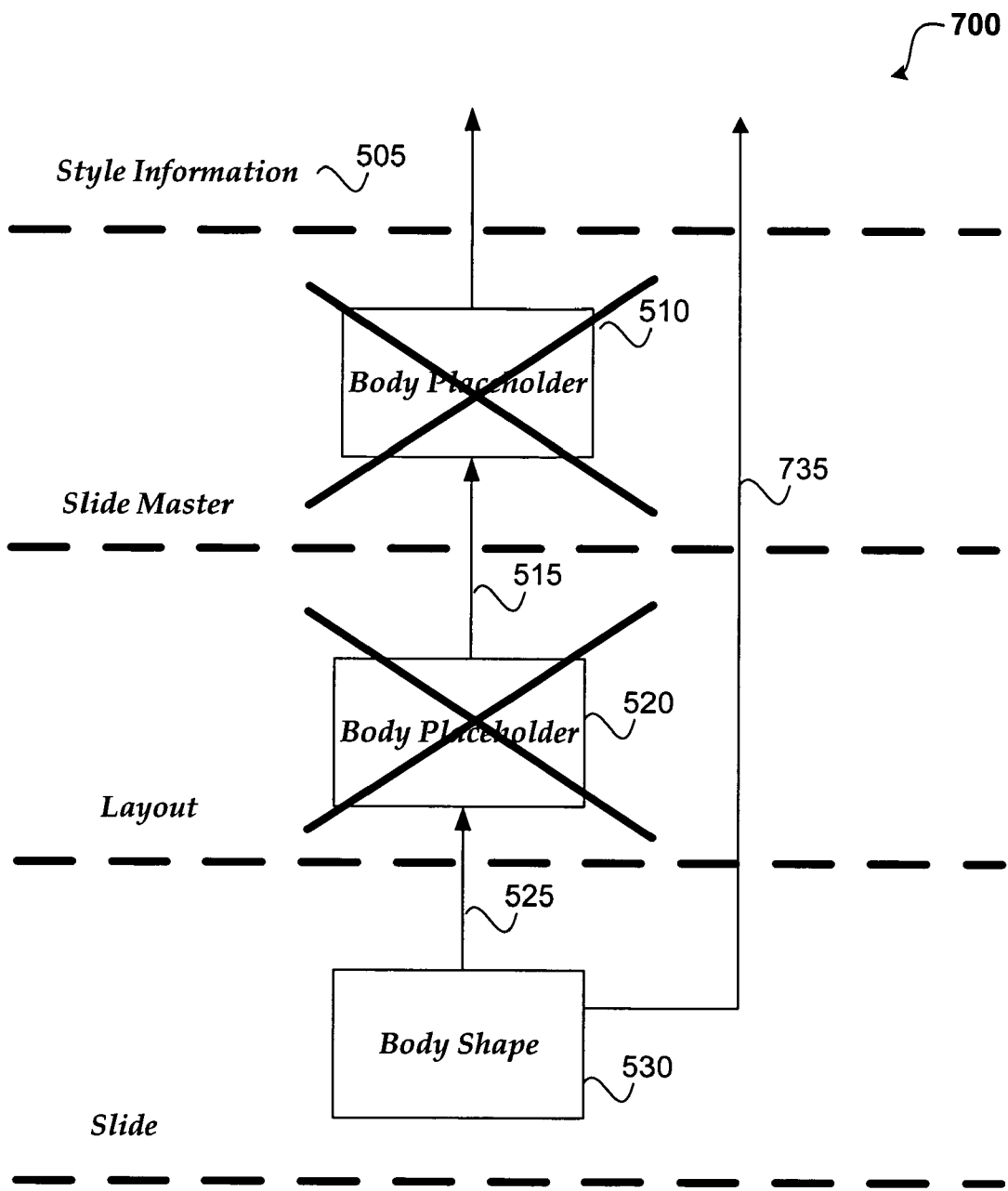
FIG. 7 illustrates removing the body placeholder at the layout level and the slide master level.

FIG. 7 illustrates removing the body placeholder at the layout level and the slide master level, in accordance with aspects of the invention. Deleting the body placeholder (520) at the layout level and the body placeholder (510) at the slide master level causes the slide to inherit its properties from the style information layer (505) (See connection 735).

Figure 8:
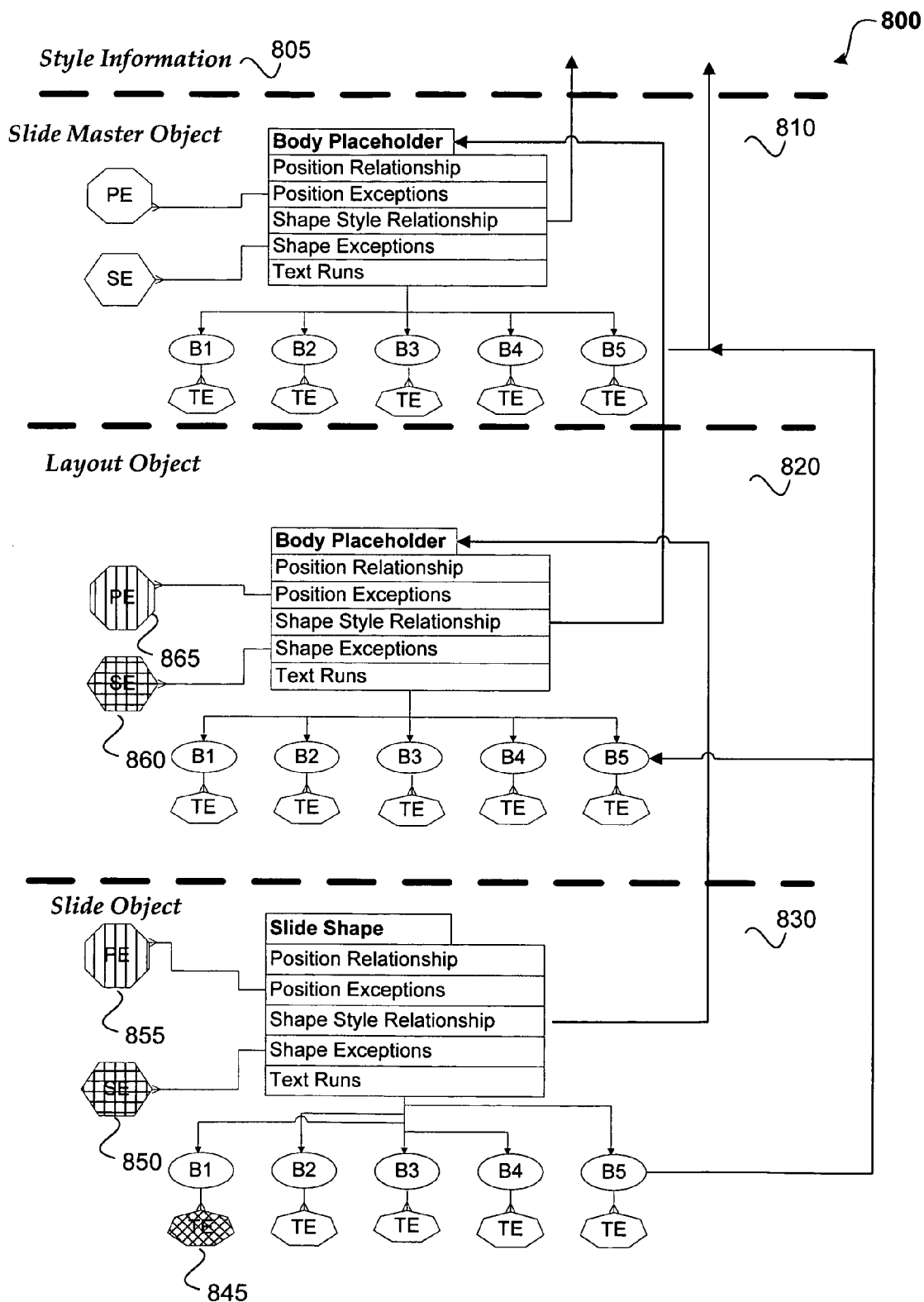
FIG. 8 illustrates exemplary property changes and exceptions at various hierarchical levels.

FIG. 8 illustrates exemplary property changes and exceptions at various hierarchical levels, in accordance with aspects of the invention.

Assume the presentation author moves the title placeholder on the layout object (820). When no exceptions have been made to the placeholder's position on the slide object (830), the slide's title placeholder's position is inherited from the title placeholder on the layout level. Therefore, the changes made by the presentation author to the layout level are reflected on the instantiated slide.

Now assume that the user decides to change the background fill on the layout object (820) from red to blue. This causes an exception to be stored on the layout itself. Since the slide object (830) has not created an exception by overriding its background fill, it inherits the background fill from the layout. The slide's background changes from red to blue in accordance with the change to the layout.

Similarly assume that the user decides to move body placeholders on the layout level. Assume that there is a position exception (855) on slide object (830) found on the instantiated slide. The user decides to select a body placeholders on the layout and reposition them. Since modifications are made at the layout level, the exceptions are simply stored with the placeholder on the layout. They are not pushed up to the master or style. Since the presentation author has created a position exception (855) to the slide (830) it does not inherit the changes made at the layout level (820).

When the slide (830) contains a slide-level position exception (855) its position relationship to the layout level is broken. When the position relationship to the layout level is broken then changes made at the layout level are not inherited by the slide.

In some instances, changes made at one level may be stored at another level. Assume the user decides to change the background fill on the slide master object (810) from red to blue. The new background fill is pushed up to the style information layer (805) where it is stored. The slide master continues to inherit its background fill from the style information layer (805).

Since the layout has not created an exception by overriding its background fill, it inherits the background fill from the slide master. The layout's background changes from red to blue in accordance with the change to the master.

Assuming the slide (830) holds an exception to the layout's background fill, it retains its original value of green and does not pick up the change from the master via the layout.

Figure 9:
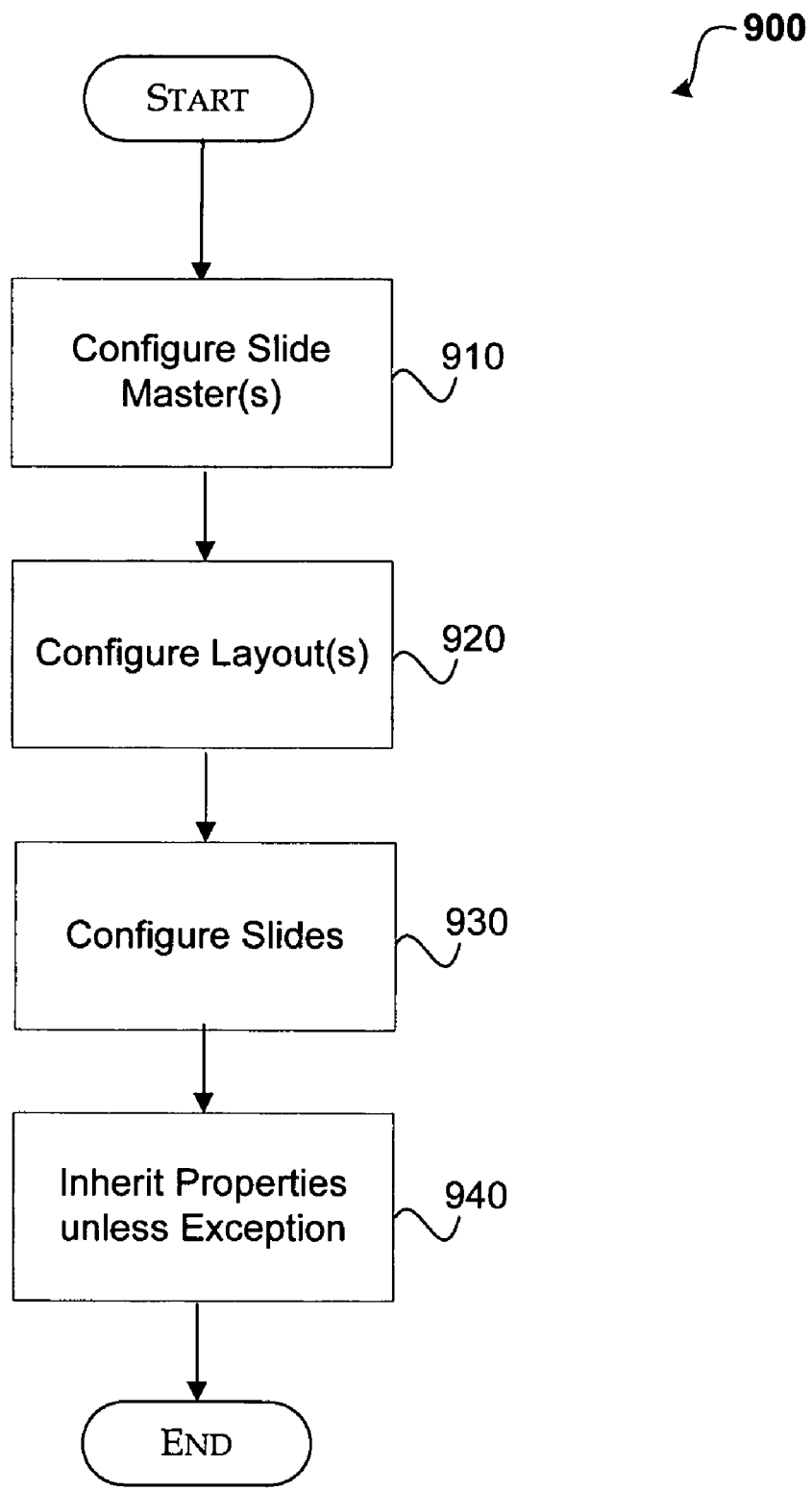
FIG. 9 illustrates a process flow for configuring and inheriting properties within a presentation program, in accordance with aspects of the invention.

FIG. 9 illustrates a process flow for configuring and inheriting properties within a presentation program, in accordance with aspects of the invention. Although the process flow shows the steps in a particular order, the steps may occur in any order. Inheritance happens as changes occur irrespective of the level at which the change is made.

After a start block, the process flows to block 910 where the properties associated with the slide master are configured. This may include adjusting a set of default properties and/or defining new properties to be included at the slide master level.

Moving to block 920, the layouts are configured. Configuring the layouts include setting the properties that are to be associated with one or more of the instantiated slides. According to one embodiment, a presentation author may use a default layout that is supplied with the presentation program and/or the user may configure custom layouts to be applied to the slides. The presentation author may also create an exception to any property they desire to override that was set at the slide master level.

Flowing to block 930 each of the slides are configured for the presentation. The presentation author associates each slide with a layout and creates any exceptions to any of the properties that have been set at one of the higher levels within the hierarchy.

Moving to block 940, properties set at a higher level are inherited by the lower levels within the hierarchy unless an exception to the property exists. The process then flows to an end block and returns to processing other actions.

Illustrative Operating Environment

Figure 1:
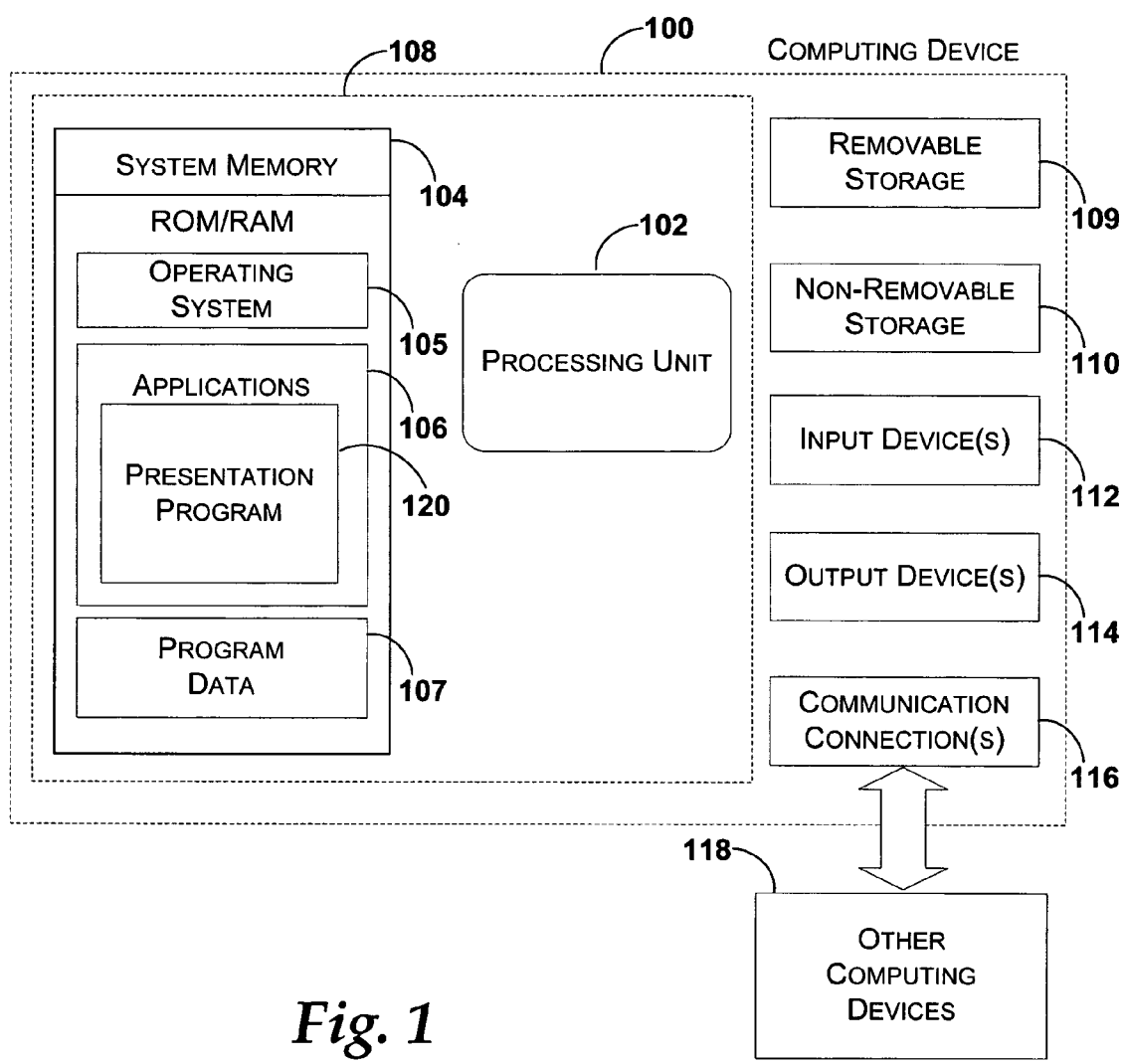
FIG. 1 illustrated an exemplary computing device that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a presentation program 120 that includes a hierarchy as described herein. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for inheriting properties associated with a presentation program, comprising:
    defining one or more slide masters at a first level within a hierarchy; wherein the slide master includes placeholders and defines a background, a layout color scheme and text styles associated with a presentation;
    defining one or more layouts at a second level within the hierarchy; wherein each of the layouts includes layout placeholders that inherit their positioning and text styles and shape formatting properties from one of the defined slide masters unless changed on the layout; wherein the first level is at a higher level within the hierarchy than the second level;
    defining one or more slides at a third level within the hierarchy; wherein each of the defined slides includes slide placeholders that inherit their positioning and text styles and shape formatting properties from one of the defined layouts unless changed on the slide; wherein the second level is at a higher level within the hierarchy than the third level;
    associating each one of the layouts with one of the slide masters;
    associating each one of the slides with one of the layouts; wherein after associating each of the layouts with one of the slide masters and associating each one of the slides with one of the layouts, changes that are made to the slide master propagate to the associated layout and also propagate to the slide that is associated with the layout unless an exception that is specified on a level of the hierarchy overrides the inheritance of a property specified at a higher level within the hierarchy; wherein the changes affect an appearance of one or more slides located at the third level within the hierarchy during the presentation; wherein when a layout placeholder is deleted on a layout then any slide that is a child of the layout inherits the slide's placeholder shape and text style properties from the slide master hierarchical level.

2. The method of claim 1, further comprising making a change to a property at a hierarchical level and propagating the change to the property to any hierarchical level that is lower than the hierarchical level.

3. The method of claim 2, further comprising creating an exception and determining when the exception exists at one of the hierarchical levels, and when the exception exists, overriding the propagation of the change from any higher hierarchical levels to the hierarchical level.

4. The method of claim 3, wherein making the change to the property comprises changing at least one of: a background; a color scheme; a text style; a header; a footer; a position; a size; a shape formatting and a placeholder.

5. The method of claim 4, wherein defining the one or more layouts at the second level within the hierarchy comprise using default layouts.

6. The method of claim 4, wherein the exception is stored at the hierarchical level at which it is made.

7. The method of claim 3, further comprising relinking one of the hierarchical levels to a higher level when an intermediate hierarchical level is removed.

8. A system for inheriting properties on slides, comprising:
    a processor and a computer-readable storage medium;
    a first hierarchical level that includes at least one slide master; wherein the slide master includes placeholders and defines a background, a layout color scheme and text styles associated with a presentation;
    a second hierarchical level that is a child to the first hierarchical level and includes layouts; wherein each of the layouts includes layout placeholders that inherit their positioning and text styles and shape formatting properties from one of the defined slide masters unless changed on the layout;
    a third hierarchical level that is a child to both the first hierarchical level and the second hierarchical level and includes slides used within a presentation; wherein the third hierarchical level is a lowest hierarchical level of the hierarchy; wherein each of the defined slides includes slide placeholders that inherit their positioning and text styles and shape formatting properties from one of the defined layouts unless changed on the slide; and
    a presentation application using the processor configured to perform the following actions; comprising:
        defining a slide master at a first level within a hierarchy;
        defining layouts at a second level within the hierarchy; wherein the first level is at a higher level within the hierarchy than the second level;
        defining slides at a third level within the hierarchy; wherein the second level is at a higher level within the hierarchy than the third level;
        associating the layouts with the slide master;
        associating each of the slides with one of the layouts; wherein after associating each of the layouts with one of the slide masters and associating each one of the slides with one of the layouts, changes that are made to the slide master propagate to the associated layout and also propagate to the slide that is associated with the layout and each slide inherits properties from one of the higher levels within the hierarchy unless an exception is specified on a level within the hierarchy.

9. The system of claim 8, further comprising making a change to a property at a hierarchical level and propagating the property change to lower hierarchical levels.

10. The system of claim 8, further comprising creating an exception to a property and overriding the propagation of the change from any higher hierarchical levels to the hierarchical level at which the exception was made.

11. The system of claim 10, wherein making the change to the property comprises changing at least one of: a background; a color scheme; a text style; a header; a footer; a position; a size; a shape formatting, and a placeholder.

12. The system of claim 11, wherein defining the layouts at the second level within the hierarchy comprise defining default layouts.

13. The system of claim 11, wherein the exception is stored at the hierarchical level at which it is made.

14. A computer-readable memory including computer-executable instructions encoded thereon for inheriting properties associated with a presentation program, comprising:

defining one or more slide masters at a first level within a hierarchy; wherein the slide master includes placeholders and defines a background, a layout color scheme and text styles associated with a presentation;

defining one or more layouts at a second level within the hierarchy; wherein each of the layouts includes layout placeholders that inherit their positioning and text styles and shape formatting properties from one of the defined slide masters unless changed on the layout; wherein the first level is at a higher level within the hierarchy than the second level;

defining one or more slides at a third level within the hierarchy; wherein each of the defined slides includes slide placeholders that inherit their positioning and text styles and shape formatting properties from one of the defined layouts unless changed on the slide; wherein the second level is at a higher level within the hierarchy than the third level;

associating each one of the layouts with one of the slide masters;

associating each one of the slides with one of the layouts; wherein after associating each of the layouts with one of the slide masters and associating each one of the slides with one of the layouts, changes that are made to the slide master propagate to the associated layout and also propagate to the slide that is associated with the layout unless an exception that is specified on a level of the hierarchy overrides the inheritance of a property specified at a higher level within the hierarchy; wherein the changes affect an appearance of one or more slides located at the third level within the hierarchy during the presentation; wherein when a layout placeholder is deleted on a layout then any slide that is a child of the layout inherits the slide's placeholder shape and text style properties from the slide master hierarchical level.

15. The computer-readable memory of claim 14, further comprising making a change to a property at a hierarchical level and propagating the change to the property to any hierarchical level that is lower than the hierarchical level.

16. The computer-readable memory of claim 15, further comprising creating an exception and determining when the exception exists at one of the hierarchical levels, and when the exception exists, overriding the propagation of the change from any higher hierarchical levels to the hierarchical level.

17. The computer-readable memory of claim 16, wherein making the change to the property comprises changing at least one of: a background; a color scheme; a text style; a header; a footer; a position; a size; a shape formatting and a placeholder.

18. The computer-readable memory of claim 17, wherein defining the one or more layouts at the second level within the hierarchy comprise using default layouts.

19. The computer-readable memory of claim 17, wherein the exception is stored at the hierarchical level at which it is made.

20. The computer-readable memory of claim 16, further comprising relinking one of the hierarchical levels to a higher level when an intermediate hierarchical level is removed.

* * * * *